Oct. 17, 1961 W. J. DAVIS 3,004,861
METHODS AND APPARATUS FOR APPLYING PROTECTIVE COATINGS
Filed Jan. 12, 1956 2 Sheets-Sheet 1

INVENTOR
WILLIAM J. DAVIS
BY Curtis Ailes, Jr.
ATTORNEY ized Oct. 17, 1961

3,004,861
METHODS AND APPARATUS FOR APPLYING PROTECTIVE COATINGS

William J. Davis, West Reading, Pa., assignor to The Polymer Corporation, a corporation of Pennsylvania
Filed Jan. 12, 1956, Ser. No. 558,768
6 Claims. (Cl. 117—18)

This invention relates to protective coatings and more particularly to methods and apparatus for applying protective coatings of lower-melting materials by a melting step to surfaces of higher-melting materials.

The methods and apparatus of the present invention are particularly suitable for applying protective coatings of plastic material to surfaces which are exposed to corrosion by chemical or electrolytic action, or mechanical friction or abrasion and represent an improvement over the method and apparatus disclosed in German Patent 933,019 issued August 18, 1955, in the name of Knapsack-Griesheim Aktiengesellschaft and in the corresponding United States patent application Serial No. 427,481 of Erwin Gemmer filed May 4, 1954, now abandoned, as continued by U.S. application 551,943, filed on December 8, 1955, now abandoned. In the Gemmer patent and applications just referred to, there is disclosed a method and apparatus in accordance with which a mass of powdered coating material is supported upon a porous plate disposed intermediate the height of an open container. A gas is introduced under pressure beneath the porous plate and thus upwardly through the porous plate and the powdered coating material to create a fluidized bed of the powdered material within the container. A preheated article to be coated is then immersed in the fluidized bed and some of the particles come in contact with the heated surface of the article and melt on that surface to form a coating layer.

A fluidized bed, is by definition, "a mass of solid particles which exhibits the liquid-like characteristics of mobility, hydrostatic pressure, and an observable upper free surface or boundary zone across which a marked change in concentration of particles occurs." This "fluidized bed" is defined as differing from a "dispersed suspension" because in the later, " . . . an uper lever or interface is not formed under conditions of continuous solids entrainment and uniform superficial velocity. (This is usually observed under conditions of low solids concentration and either high fluid velocity or low solids feed rate. Thus, in general, a dispersed suspension is analogous to a vapor, whereas a fluidized bed is analogous to a liquid. One example of this condition is observed in pneumatic transport. In a vessel containing a fluidized bed dilute suspension of entrained particles above the bed also is such a dispersed suspension, and is frequently referred to as the 'disperse phase' while the bed itself is referred to as the 'dense phase')." The fluidized bed is thus alternatively defined above as a "dense phase." These definitions are to be found in the article entitled "Fluidization Nomenclature and Symbols" appearing at pages 1249 and 1250 in "Industrial and Engineering Chemistry," vol. 41, No. 6, June 1949.

The method and apparatus of the Gemmer patents are satisfactory for coating articles which are capable of being received within the container but difficulties are encountered in applying coatings to large articles or articles which are not capable of being immersed in the bed of fluidized material within the container.

Accordingly, it is an object of this invention to provide improved methods and apparatus for applying a protective coating to a surface.

It is a further object of this invention to provide improved methods and apparatus for applying a protective coating to articles which are large relative to the coating apparatus and thus are incapable of being inserted into a coating apparatus of the type disclosed in the Gemmer application.

It is another object of this invention to provide methods and apparatus suitable for coating the inner and outer surfaces of tubular members and the like.

In achievement of these objectives, there is provided in accordance with one embodiment of the invention a method and apparatus for applying a powdered coating material to a heated surface external of the container for the coating material. The powdered coating material is fluidized by the flow of a gas stream introduced below the coating material with the gas flow being adjusted to cause the uppermost portions of the fluidized bed of particles to reach an equilibrium height which extends above the top of at least a portion of the side walls of the container adjacent to a heated surface, permitting the particles to pass into contact therewith.

Further objects and advantages of the invention will become apparent from the following description taken in conjunction with the accompanying drawings in which.

Figure 1:
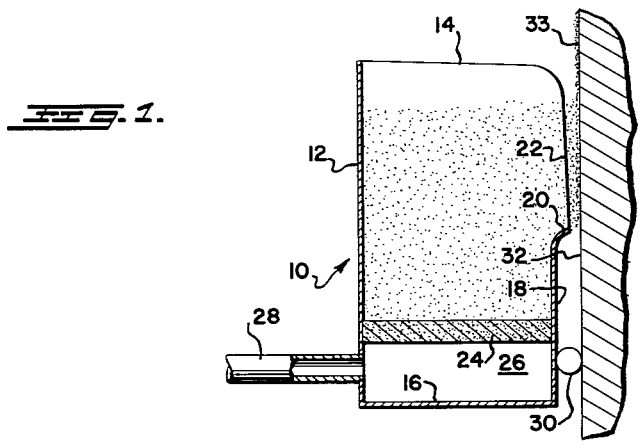
FIG. 1 is a vertical sectional view illustrating the method and apparatus for applying the protective coating material to a surface in accordance with one embodiment of the invention.

Referring now to the drawings, there is shown in FIG. 1 a receptacle or container generally indicated at 10. Container 10 may be of generally rectangular shape and is provided with vertical walls 12 terminating in an upper edge 14. The container has a bottom portion 16. One of the walls 12 is of reduced height to define a wall portion 18 of reduced height extending upwardly from bottom 16. Reduced wall portion 18 terminates in an outwardly flared lip 20. The provision of reduced wall portion 18 defines an opening 22 in the container of substantial size relative to the total area of wall 12, the lower boundary of opening 22 being defined by lip 20.

A gas permeable porous or perforated plate member 24 is positioned horizontally in container 10 adjacent but spaced above bottom portion 16 of the container, plate 24 being suitably supported in position with respect to the container 10. The space between the bottom surface of porous plate 24 and bottom plate 16 of the container defines a gas-admission chamber or space 26. An inlet conduit 28 is connected to and communicates with chamber 26 below porous plate 24.

To facilitate movement of container 10 along the surface which is being coated and, at the same time, to maintain a predetermined desired spacing of opening 22 with respect to that surface, container 22 may be provided with rollers 30 along wall portion 18.

A mass of the powdered coating material, which is to be fluidized, is positioned on the upper surface of the gas permeable porous or perforated plate 24, the upper surface of the layer of powdered material in its unfluidized condition lying below lip portion 20 of the container. The coating material to be used is in the form of a pulverulent powder and preferably has a granular size between about 0.001 and 0.024 inch. Best results are obtainable with a granular size of between about 0.002 and 0.012 inch. This invention is particularly valuable for and applicable to the production of coatings from powders of high-melting high-molecular weight organic polymeric thermoplastic resins such as polyethylene and the linear polyamides generally referred to as "nylons." Nylons which are particularly useful are polyhexamethylene adipamide, polyhexamethylene sebacamide, and the polycaprolactams such as the polymer of epsilon-caprolactam. However, the protective coatings of this invention may consist of practically any powdered material which will not rapidly decompose at a temperature higher than its melting point, and a melting point which is lower than the melting or decomposition point of the material from which the articles to be coated are made. For instance, any of the coating materials disclosed in the aforementioned Gemmer application, Serial No. 427,481, and the continuation thereof, are usable in the practice of the present invention.

The surface 32 which is to be coated may be the surface of an article much larger than the container 10 and may be, for example, the side of a ship. Surface 32 is preheated either in its entirety or locally in the region where the coating is next to be applied, depending upon the size of the surface, to a temperature sufficient to melt the particular powdered coating material which is being used. A suitable gas, such as air, or nitrogen ($N_2$) or carbon dioxide ($CO_2$), is introduced under pressure through inlet conduit 28 into chamber 26 beneath porous plate 24. The gas passes through the pores of plate 24 and causes the powdered coating material to be held in a fluidized bed above plate 24 as indicated in FIG. 1. The pressure of the gaseous medium is so adjusted as to be sufficient to cause the upper level of the fluidized bed of coating material to reach an equilibrium height extending above the edge of lip 20 but below the top edge 14 of container 10. Since the equilibrium height extends above lip 20 of outlet opening 22, the fluidized bed of coating particles extends outwardly through opening 22 and into contact with heated surface 32. This causes the particles of coating material to melt onto surface 32, covering that surface with a coating as indicated at 33. The thickness of the coating 33 may be adjusted by the length of time which the opening 22 of container 10 is maintained in proximity to surface 32. A relative movement is established between the surface 32 and the container 10, such as a relative vertical movement by use of the roller 30, by means of which the opening 22 of the container 10 comes into proximity to progressively lower portions of the surface 32. Thus, the container 10 is brought into proximity to all of the portions of the surface 32 upon which a coating is desired. Preferably, the rate of relative movement between the container 10 and the surface 32 is at a uniform speed so that the coating 33 is formed at a uniform thickness. If a greater coating thickness is desired, the speed of relative movement can be reduced and if a thinner coating is desired, the speed of movement can be increased. Similarly, the thickness of the coating 33 may also be influenced by the temperature to which the surface 32 is preheated. High preheat temperatures result in thicker coatings and lower preheat temperatures in thinner coatings.

Figure 2:
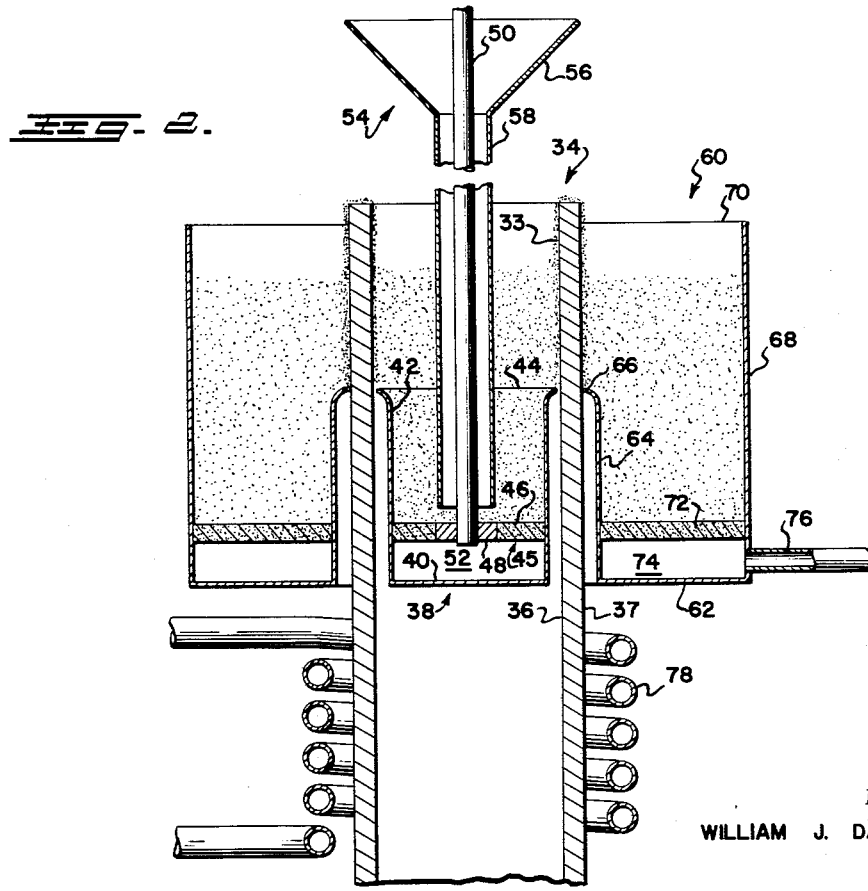
FIG. 2 is a view in vertical section of another embodiment of the invention adapted for coating the inner and outer surfaces of a tubular conduit.

As shown in FIG. 2, a modified method and apparatus is provided for coating the inner and/or outer surfaces of a tubular conduit or pipe. The conduit which is to be coated is generally indicated at 34 and includes an inner surface 36 and an outer surface 37. The coating apparatus for coating the interior surface 36 of pipe 34 includes a generally cylindrical cup-like container indicated at 38 arranged for positioning coaxially within conduit 34 and including a bottom portion 40 and a cylindrical vertical wall 42 of smaller diameter than the interior diameter of conduit 34. The upper end of vertical wall 42 terminates in an outwardly flared lip 44 which closely approaches inner surface 36 of pipe 34 but is sufficiently spaced therefrom to provide a clearance which permits unhampered relative axial movement between container 38 and pipe 34. Container 38 may be provided with a suitable sealing means in the region of flared lip 44 to substantially prevent the passage of fluidized coating material through the clearance space between lip 44 and surface 36 which does not adhere to the surface 36. For example, a gasket formed of resilient high temperature material such as a silicone rubber may be used as a sealing means between lip 44 and surface 36. However, such a seal is not usually essential since most of the powder which passes through the clearance space adheres to surface 36 and the small amount of powder which is otherwise lost is negligible. Similar resilient sealing gaskets may also be used, if desired, with the lip 20 of the apparatus of FIG. 1 or with the corresponding portions of the other modifications of the invention described below.

A disc-shaped plate member generally indicated at 45 is suitably supported in horizontal position within container 38 adjacent but spaced from bottom portion 40 of the container. Plate 45 includes a porous or perforated radially outer portion 46 and a radially inner non-porous central portion 48.

A conduit 50 connected to a suitable source of gas under pressure extends vertically downwardly through conduit 34 and into container 38, the lower end of conduit 50 passing through non-porous plate portion 48 and into the gas-admission chamber 52 bounded by plate 45 and bottom 40 of the container.

The powdered coating material is disposed on the upper surface of plate 45, the height of the unfluidized powdered material extending to a level below the upper edge 44 of container 38. Additional powdered material can be supplied through the funnel member generally indicated at 54 and including the upper funnel portion 56 positioned exteriorly of pipe 34 and the connecting delivery tube 58 which extends from funnel portion 56 to a point adjacent but spaced from the upper surface of plate 45. Funnel 56 and connecting delivery tube portion 58 are coaxially disposed about the center gas-supply conduit 50.

It will be seen that the portion of the plate 45 directly beneath the lower end of the funnel delivery tube 58 is the non-porous plate portion 48. Use of the non-porous plate portion 48 below the discharge end of funnel delivery tube 58 improves the flow of powdered material from the lower end of funnel portion 58 by avoiding an upward flow of gas through plate 45 in the immediate region of the discharge of the make-up powder from tube 58. Under some conditions, it may be desirable to pressurize funnel 54 and delivery tube 58 in order to assure a positive and uniform flow of the powdered coating material into the container or, alternatively, it may be desirable to entrain the powdered material in a moving stream of gas in order to transport it to the container.

An apparatus generally indicated at 60 is provided for coating the outer surface 37 of pipe 34. The apparatus 60 is a generally annular-shaped container coaxial with inner container 38 and adapted to surround outer surface 37. Apparatus 60 includes a closed bottom portion 62 of annular shape, and an inner wall 64 extending upwardly from the radially inner edge of bottom portion 62, and positioned adjacent but radially spaced from surface 37. The upper edge of wall 64 terminates in an inwardly flared lip 66 which approaches very close to surface 37 but yet provides sufficient clearance to permit easy relative movement between lip 66 and surface 37. A sealing means of the type previously described may be carried by edge 66 to seal the clearance space between edge 66 and surface 37. However, such a sealing means is not usually essential.

Container 60 also includes a vertical wall 68 which extends upwardly from the radially outer periphery of base portion 62 for a height which is greater than the height of the radially inner wall portion 64. Wall 68 terminates in an upper edge 70 which is spaced a substantial distance above the flared edge 66 of inner wall 64.

A porous or perforated annular plate member 72 is secured in the lower end of container 60 adjacent but spaced from bottom portion 62 of the container. The space between plate 72 and bottom portion 62 defines a gas-admission chamber 74. A tubular conduit 76 connected to the source of pressurized gas supply is connected to the lower portion of container 60 and communicates with the gas-admission chamber 74 below porous plate 72.

Pipe 34 is preheated in the region to which the coating layer is being applied by any suitable means such as, for example, an induction heating coil 78 which is coaxially positioned beneath the containers 38 and 60 to surround the outer surface of pipe 34.

In the operation of the apparatus of FIG. 2, the powdered coating material is disposed on the upper surface of plate 45 and also on the upper surface of porous plate 72. The unfluidized powdered material should extend to a height somewhat below the flared lip 44 of container 38 and also to a height below flared lip 66 of outer container 60. The supply of powdered material may be constantly renewed in container 38 as it is used during the coating process by means of the funnel device 54.

Gas is supplied under pressure through conduit 50 to the chamber 52 below plate 45 and through conduit 76 to the chamber 74 below plate 72. The gas passes upwardly from chamber 52 through the porous plate portion 46 to create a fluidized bed of the powdered material above plate 45. In a similar manner, the gas from inlet conduit 76 passes from chamber 74 up through porous plate 72 to create a fluidized bed of the powdered material above plate 72. The pressure of the gas through the respective inlet conduits 50 and 76 should be so adjusted as to cause the beds of fluidized powder in containers 38 and 60 to rise above the level of flared lip 44 of container 38 and above the level of flared lip 66 of container 60. The gas pressure should also be of such value as to be insufficient to cause the equilibrium height of the uppermost portion of the bed of fluidized powder in the outer container 60 to extend to a height above the upper edge portion 70 of the outer wall 68.

Since the fluidized bed in container 60 has an equilibrium height below edge 70, the bed of fluidized particles is confined within container 60 but is in contact with the outer surface 37 of pipe 34 due to the reduced height of the inner wall portion 64. In a similar manner, by having the gas flow such that the equilibrium height of the fluidized bed in container 38 is above edge 44, the particles come into contact with interior surface 36 of pipe 34. Surface 36 of pipe 34 serves to confine the fluidized bed of particles of container 38.

In applying the coating material, pipe 34 and containers 38 and 60 are moved relative to one another; thus, for example, containers 38 and 60 as well as the induction heating coil 78 may be moved downwardly at a uniform rate to expose successive areas of surfaces 36 and 37 to contact with the fluidized beds of powdered material of the respective containers 38 and 60. As the containers 38 and 60 are moved downwardly, successive heated areas of surfaces 36 and 37 come into contact with the fluidized particles and, since surfaces 36 and 37 are heated to a temperature sufficient to melt the particles upon contact, a uniform coating of the powdered material is deposited by the particles melting onto surfaces 36 and 37. The thickness of the coating layer can be regulated by the rate of relative movement of pipe 34 with respect to containers 38 and 60.

Instead of holding pipe 34 fixed and moving containers 38 and 60 downwardly with respect thereto, the containers 38, 60 and the induction heating coil 78 may be held fixed and the pipe 34 may be moved upwardly. Whether pipe 34 remains fixed and the containers 38 and 60 are moved or whether pipe 34 is moved and the containers 38 and 60 are held fixed, it is preferable that the direction of relative motion of the conduit with respect to the containers be such that the surface areas which have just been coated move in a direction away from the containers 38 and 60 to prevent the containers from coming in contact with or bumping the unhardened coating just after it has been applied, which would cause damage to the coating.

Instead of having the gas inlet conduit 50 and the make-up powder delivery tube 58 extend downwardly into the container 38, as shown, these conduits may instead extend upwardly through the bottom of container 38.

Figure 3:
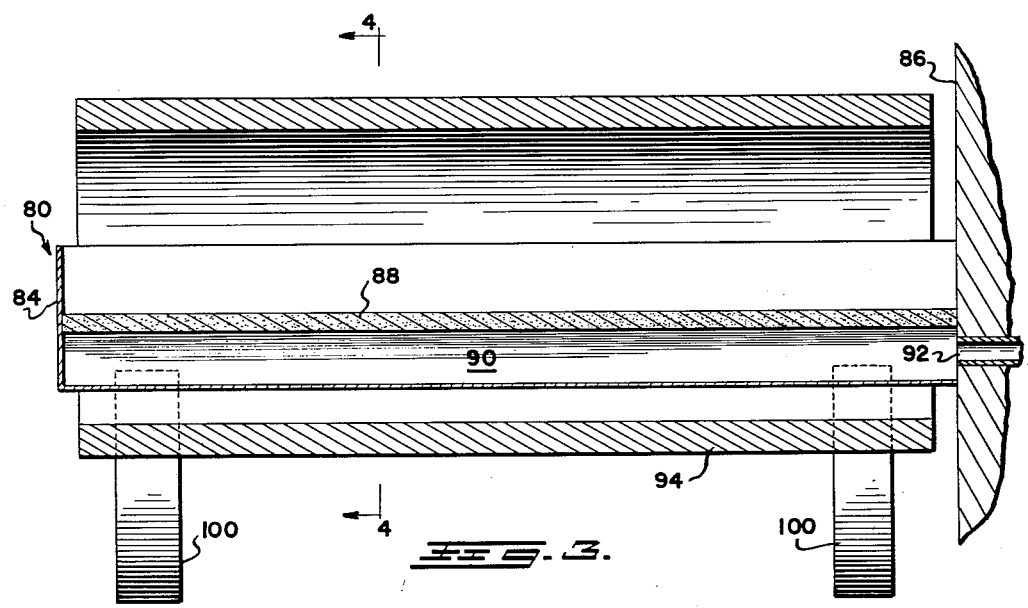
FIG. 3 is a view in vertical section of a modified form of apparatus used for coating the inner and outer surfaces of a conduit member, with the conduit disposed in a horizontal plane.
Figure 4:
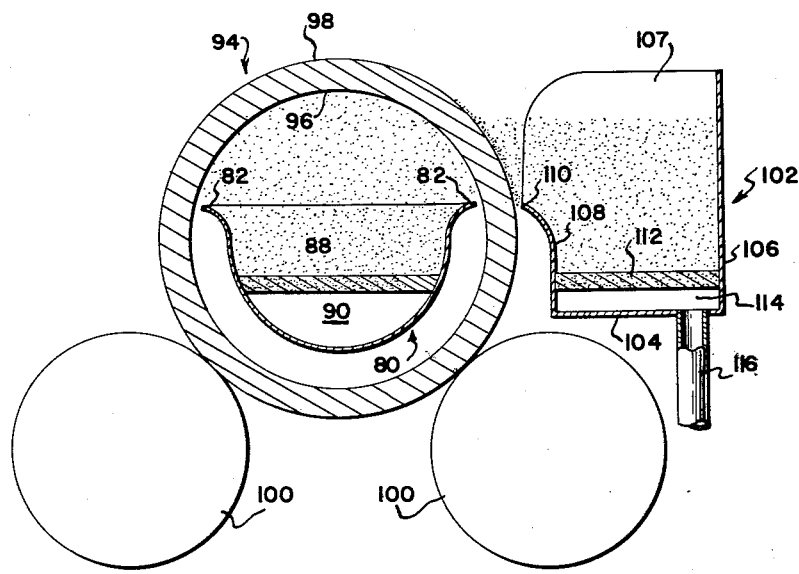
FIG. 4 is a view in transverse section along line 4—4 of FIG. 3.

The apparatus shown in FIGS. 3 and 4 is particularly adapted for coating pipes or conduits which are disposed in a horizontal position. The horizontal coating apparatus of FIGS. 3 and 4 includes an elongated container generally indicated at 80 of generally semi-cylindrical shape and terminating in outwardly flared edges 82. Container 80 is closed at its outer end by an end wall portion 84 and is supported at its opposite end in cantilever fashion by a support 86, the surface of support 86 defining an end wall for container 80. A porous or perforated plate member 88 is suitably supported at an intermediate height within container 80, plate 88 extending for the entire length of container 80. The space between the underneath surface of plate 88 and the bottom wall of container 80 defines a gas admission chamber 90 which extends for the entire length of container 80.

A gas under pressure is supplied to gas-admission chamber 90 through an inlet conduit 92 which extends through stationary support 86.

The conduit or pipe which is to be coated is indicated at 94 and includes an inner surface 96 and an outer surface 98. Container 80 and its support 86 are preferably movable, so that container 80 may be linearly inserted into position within pipe 94. The use of the elongated container 80 with its cantilever support permits container 80 to be inserted and to be subsequently withdrawn with precision to avoid contact with the soft, newly applied coating.

Conduit 94 is supported on four or more rollers such as those indicated at 100. One or more of the rollers 100 is driven by a motor to rotate conduit 94 at a suitable speed, such as 60 revolutions or more per minute while the coating is being applied.

The powdered coating material is disposed on the upper surface of porous plate 88 and gas under pressure is introduced through inlet pipe 92 to gas admission chamber 90. The pressure of the applied gas is of sufficient magnitude to produce a bed of fluidized particles of coating material which extends above the flared rim or lip 82 of container 80. Pipe 94 is preheated above the melting temperature of the particular coating material being used so that the particles of coating material coming in contact with surface 96 will melt thereon and deposit a layer of the coating material.

If the length of the pipe being coated is relatively long, two containers such as container 80 and each carried by a support similar to support 86 may be inserted in pipe 94 from opposite ends thereof and then withdrawn after the coating has been completed. Thus, neither container need be of an impractical length.

If it is desired to coat the outer surface 98 of pipe 94, a container such as that indicated at 102 is positioned adjacent to the outer surface 98 of the pipe. Container 102 is an elongated member having a length equal to the length of the conduit being coated and includes a bottom portion 104, an outer vertical wall 106 and an inner wall portion 108 of reduced height disposed adjacent the outer surface 98 being coated. The container has opposite end walls 107. Reduced wall portion 108 terminates at its upper edge in a flared lip 110 which is disposed closely adjacent to surface 98 but is sufficiently spaced therefrom to provide a clearance which permits free rotation of conduit 94.

A porous or perforated plate member 112 is suitably supported within container 102 adjacent but spaced from bottom 104 to define a gas admission chamber 114 which extends for the entire length of the container. A gas inlet pipe connected to a source of pressurized gas is connected to container 102 and communicates with gas admission chamber 114. Gas is supplied through pipe 116 at a pressure sufficient to raise the particles of coating material in a fluidized bed above edge 110 and into contact with outer surface 98 of conduit 94.

The preferred procedure when using the apparatus of FIGS. 3 and 4 is to assemble the coating apparatus including containers 80 and 102 with respect to the preheated pipe and then to start the support roller driving motor to commence rotation of the pipe. After the pipe or conduit 94 has begun to rotate, the gas is admitted to gas-admission chambers 90 and 114 of the respective containers to fluidize the bed of powdered particles and thus to start the coating of the surfaces of the pipe 94. The gas pressure is so adjusted as to cause the respective fluidized beds to reach equilibrium heights above the respective edges 82 and 110 so that the powdered particles will come into contact with the surfaces 96 and 98.

In using the appaartus of FIGS. 3 and 4, the thickness of the coating layer can be regulated by suitably controlling the rate of rotation of the conduit being coated, and the number of revolutions during which the coating is applied. If the pipe is rotated at a speed of the order of 60 revolutions or more per minute, the amount of coating which is applied in any one revolution is relatively small with respect to the total coating thickness, so that a relatively uniform coating can be achieved even though the number of revolutions or the starting and stopping angle of rotation of the pipe are not precisely controlled.

In the illustrated embodiment of FIGS. 3-4, the container 80 does not move during the coating operation and the relative movement between container 80 and pipe 94 is due to the rotation of pipe 94. However, container 80 may be made short relative to pipe 94 and may be moved axially as pipe 94 is rotated to apply the coating gradually to the entire inner surface 96.

In describing the embodiments shown in FIGS. 2, 3 and 4, apparatus for applying coatings to both the interior and exterior surfaces of the pipe or tubular conduit were described. Obviously, if it were desired to coat only one surface, only the coating apparatus applicable to that surface would be employed.

It can be seen from the foregoing that there are provided in accordance with this invention improved methods and apparatus for applying a protective coating to surfaces for protection against chemical or electrolytic action or for other purposes.

The methods and apparatus of the present invention are especially suitable for coating surfaces which are large relative to the container for the powdered coating material and also for coating the interior and exterior surfaces of pipes or tubular conduits and the like.

The process can be used generally for forming coatings of any materials which can be sufficiently reduced in particle size so as to be fluidized by an ascending current of gas, and which are capable of melting or fusing into an adherent and coherent layer upon the article or surface which is to be coated. This should generally occur at a temperature which does not seriously decompose the coating material and which does not cause melting or decomposition of the article which is to be coated. However, it will be understood that a slight amount of decomposition or degradation of the materials may not prove to be serious and may, in certain cases, actually improve the adhesion of the coating material to the coated article. Thus, it may be possible, for instance, to heat the article which is to be coated to a temperature above the decomposition point of the coating material as long as the heating temperature does not exceed the decomposition temperature by too great a margin. A more complete discussion of this matter is contained in the aforementioned Gemmer continuation application. The process and apparatus have been found particularly useful for the application of coatings of various synthetic and natural resin materials to high melting materials, such as metals, and particularly to steel. These coatings may be particularly useful for the purpose of providing resistance against chemical or electrolytic corrosion, as well as for electrical insulation or abrasion and wear resistance.

An important feature of this method and apparatus resides in the fact that relatively heavy uniform coatings can be applied in a single step whereas coating materials applied by use of dispersions or solvents in which the dispersing or solvent liquid must be evaporated require a number of applications in order to build up a coating thickness which is adequate for many purposes. Because of the fact that the process and apparatus are adapted for use without any need for a solvent or dispersing liquid, as indicated above, this process is particularly well suited for the production of coatings of highly chemically resistant and solvent-resistant materials such as nylons. Because of the solvent-resistant characteristics of such coating materials, the utility of the process is obviously very high.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. Apparatus for coating both the interior and exterior surfaces of a substantially vertically disposed heated tubular article having a substantially uniform cross sectional profile comprising an inner container and an outer surrounding container for beds of fluidized, pulverulent, coating material, each of said containers including a gas-pervious partition disposed above the bottom thereof and enclosing and defining a gas admission chamber in the bottom area thereof; said outer container having inner and outer side walls terminating in upper edge portions which define the top opening thereof, the inner side wall of the outer container also defining a bore extending in a direction parallel to the axis of the article to be coated and adapted to receive said article; said inner container having an upper edge portion defining its top opening, the upper edge of the inner side wall of the outer container being shaped to conform substantially to the exterior surface of the tubular article, the upper edge of the inner container being shaped to conform substantially to the interior surface of the tubular article and being spaced from the upper inner edge of the outer container to define an opening of a size and shape conforming substantially to the cross section of the tubular article to be coated; said containers including connections for the introduction of gas under pressure to said gas admission chambers for fluidizing and expanding a bed of pulverulent coating material contained therein to a height above the upper inner edge of the outer container and above the upper edge of the inner container and into contact with the surfaces to be coated.

2. The apparatus as defined in claim 1 in which said outer container includes an outer wall member having a height above the height of the expansion of the fluidized coating material for the confinement and containment thereof;

3. The apparatus of claim 2 including means for establishing relative motion between said containers and the article to be coated;

4. The apparatus of claim 3 including a heating device for heating the article to be coated;

5. Apparatus for the application of coatings of dry, solid, pulverulent heat-fusible material comprising a container having laterally confining walls for confining a bed of said material in the air fluidized state, said container having a substantial top opening and a partition pervious to gas under pressure but impervious to the bed of said material when supported thereon and adapted to support said bed, said container including a gas admission chamber below said partition to supply gas to fluidize and expand said bed of material and a connection for introducing said gas under pressure, at least a portion of the periphery of said confining walls being adapted and arranged to conform to the contours of the heated surface to be coated, said portion of the confining walls extending upwardly above said partition a distance greater than the depth of said bed when non-fluidized thereby confining it but terminating below the level of said bed when fluidized and being open above said periphery thereby to permit (1) said fluidized bed to flow over said periphery and into contact with said heated surface, and (2) substantially the entire exterior surface of the article between the fluidized bed level and said periphery to be exposed to the fluidized bed, and (3) the rising current of gas to maintain the pulverulent material fluidized adjacent to the surface of the article as said material flows over said periphery, the remainder of said confining walls extending upwardly away from said partition a distance greater than the depth of said fluidized bed thereby to confine said bed when fluidized.

6. A method of simultaneously coating the exterior and interior surfaces of a substantially vertically disposed elongated tubular article comprising the steps of (1) forming a first fluidized bed consisting of a dense phase of solid, pulverulent, layer-forming material; (2) forming a second fluidized bed consisting of a dense phase of solid, pulverulent layer-forming material separated and disposed from the first fluidized bed by a gap which conforms substantially to the cross section of the article to be coated; (3) preheating the article; (4) inserting the article in said gap; and (5) simultaneously contacting the exterior and interior surfaces of said preheated article with the dense phases of the first and second fluidized beds, respectively, by permitting a portion of the dense phase from each bed to flow into contact with the adjacent heated surfaces of the article whereby the heat of the article causes softening and coalescense of at least some of the layer-forming material on the exterior and interior surfaces of the article to form the desired coatings.

References Cited in the file of this patent
UNITED STATES PATENTS

| | | |
|---|---|---|
| 924,452 | Graham | June 8, 1909 |
| 1,023,336 | Salsbury | Apr. 16, 1912 |
| 1,496,309 | Girvin | June 3, 1924 |
| 1,534,846 | Fraser et al. | Apr. 21, 1925 |
| 1,687,102 | Meurer | Oct. 9, 1928 |
| 1,911,124 | Linder et al. | May 23, 1933 |
| 2,038,251 | Vogt | Apr. 21, 1936 |
| 2,067,949 | Rez | Jan. 19, 1937 |
| 2,095,888 | Perkins | Oct. 12, 1937 |
| 2,123,537 | Marr | July 12, 1938 |
| 2,162,317 | Rez | June 13, 1939 |
| 2,262,184 | Ireton | Nov. 11, 1941 |
| 2,320,801 | Simons | June 1, 1943 |
| 2,336,946 | Marden et al. | Dec. 14, 1943 |
| 2,688,563 | Kieffer | Sept. 7, 1954 |
| 2,719,093 | Voris | Sept. 27, 1955 |
| 2,753,796 | Wood et al. | July 10, 1956 |
| 2,844,489 | Gemmer | July 22, 1958 |
| 2,880,109 | Current et al. | Mar. 31, 1959 |

FOREIGN PATENTS

| | | |
|---|---|---|
| 1,100,263 | France | Mar. 30, 1955 |
| 933,019 | Germany | Sept. 12, 1955 |
| 579,442 | Great Britain | Aug. 2, 1946 |